United States Patent
Riise et al.

(10) Patent No.: US 8,302,777 B2
(45) Date of Patent: Nov. 6, 2012

(54) REDUCING THE CONTENT OF HEAVY METALS IN RECOVERED PLASTICS

(75) Inventors: Brian L. Riise, San Ramon, CA (US); Günther Höggerl, Seitenstetten (AT)

(73) Assignee: MBA Polymers, Inc., Richmond, CA (US)

( * ) Notice: Subject to any disclaimer, the term of this patent is extended or adjusted under 35 U.S.C. 154(b) by 144 days.

(21) Appl. No.: 12/905,339

(22) Filed: Oct. 15, 2010

(65) Prior Publication Data

US 2011/0089086 A1  Apr. 21, 2011

Related U.S. Application Data

(60) Provisional application No. 61/252,570, filed on Oct. 16, 2009.

(51) Int. Cl.
*B03B 9/00* (2006.01)
(52) U.S. Cl. ............ 209/10; 209/576; 209/580; 241/19; 241/24.14
(58) Field of Classification Search ................. 209/552, 209/576, 580, 581, 582
See application file for complete search history.

(56) References Cited

U.S. PATENT DOCUMENTS

| | | | |
|---|---|---|---|
| 4,251,034 A * | 2/1981 | Corr et al. | 241/14 |
| 6,920,982 B2 * | 7/2005 | Mankosa et al. | 209/8 |
| 8,074,908 B2 * | 12/2011 | Adamec | 241/19 |
| 2004/0044436 A1 * | 3/2004 | Arleth et al. | 700/224 |
| 2009/0302139 A1 * | 12/2009 | Adamec | 241/24.14 |
| 2011/0089086 A1 * | 4/2011 | Riise et al. | 209/10 |

FOREIGN PATENT DOCUMENTS

| | | | |
|---|---|---|---|
| JP | 2002159920 A | * | 6/2002 |
| JP | 2008260208 | | 10/2008 |

OTHER PUBLICATIONS

Meyer, et al. Recycling von ABS-Technologien und Perspektiven, Teil 2, *Plastverarbeiter*, vol. 45, No. 6 (Jun. 1, 1994), pp. 80-83.
Zeiger "Sorting PET Flakes with the Mogensen Mikro-Sort AF0916" *Aufbereitungs Technik* vol. 44, No. 11/12 (Nov. 1, 2003) pp. 41-45.
International Search Report and Written Opinion for Application No. PCT/US2010/052870, dated Feb. 7, 2011, 12 pages.
International Preliminary Report on Patentability for application PCT/US2010/052870, dated Apr. 26, 2012, 10 pages.

* cited by examiner

*Primary Examiner* — Terrell Matthews
(74) *Attorney, Agent, or Firm* — Fish & Richardson P.C.

(57) ABSTRACT

A method for reducing the content of a heavy metal in a mixture of solid plastic materials, wherein the mixture includes plastic flakes and there are at least two different colors of plastic flakes in the mixture. A percentage of each of two or more colors of flakes in the mixture is determined. A heavy metal content in the mixture based on the determined percentages is predicted. Whether the predicted content of the heavy metal in the mixture exceeds a pre-determined threshold is determined. If the predicted content exceeds the pre-determined threshold, a color sorting step is performed to obtain a subset of the mixture of plastic flakes, wherein the subset of the mixture of plastic flakes has a lower heavy metal content than the mixture prior to the color sorting step.

25 Claims, 3 Drawing Sheets

Steps for reduction of the Cd content below a pre-determined threshold

FIG. 1: Steps for reduction of the Cd content below a pre-determined threshold

FIG. 2: Schematic of articles being detected and ejected based on color in a chute sorter FIG. 3: Plot of reflectivities of red and blue are distinguished from each other and from black, gray and white.

FIG. 4: A process to recover light and dark colored ABS flakes from WEEE with levels of Cd below 100 ppm.

REDUCING THE CONTENT OF HEAVY METALS IN RECOVERED PLASTICS

CLAIM OF PRIORITY

This application claims priority under 35 USC §119(e) to U.S. Patent Application Ser. No. 61/252,570, filed on Oct. 16, 2009, the entire contents of which are hereby incorporated by reference.

TECHNICAL FIELD

This disclosure relates to material separations, including recycling plastics from streams of waste plastics and other materials.

BACKGROUND

Products made from or incorporating plastic are a part of almost any work place or home environment. Generally, the plastics that are used to create these products are formed from virgin plastic materials. That is, the plastics are produced from petroleum and are not made from existing plastic materials. Once the products have outlived their useful lives, they are generally sent to waste disposal or a recycling plant.

Recycling plastic has a variety of benefits over creating virgin plastic from petroleum. Generally, less energy is required to manufacture an article from recycled plastic materials derived from post-consumer and post-industrial waste materials and plastic scrap (collectively referred to in this specification as "waste plastic material"), than from the comparable virgin plastic. Recycling plastic materials obviates the need for disposing of the plastic materials or product. Further, less of the earth's limited resources, such as petroleum and polymers, are used to form virgin plastic materials.

When plastic materials are sent to be recycled, the feed streams rich in plastics may be separated into multiple product and byproduct streams. Generally, the recycling processes can be applied to a variety of plastics-rich streams derived from post-industrial and post-consumer sources. These streams may include, for example, plastics from office automation equipment (printers, computers, copiers, etc.), white goods (refrigerators, washing machines, etc.), consumer electronics (televisions, video cassette recorders, stereos, etc.), automotive shredder residue, packaging waste, household waste, building waste and industrial molding and extrusion scrap.

Different types of plastic parts are often processed into shredded plastic-rich streams. The variety of parts can vary from a single type of part from a single manufacturer up to multiple families of part types. Many variations exist, depending on at least the nature of the shredding operation. Plastics from more than one source of durable goods may be including in the mix of materials fed to a plastics recycling plant. This means that a very broad range of plastics may be included in the feed mixture. Some of the prevalent polymer types in the waste plastic materials are acrylonitrile-butadiene-styrene (ABS), high impact polystyrene (HIPS), polypropylene (PP), and polycarbonate (PC), but other polymers may also be present.

Some additives can be included in the recycled plastic materials based on the color of the waste plastic material from which the material is derived, and/or the conditions (e.g., heat, light, chemicals) to which the waste plastic material was intended to be exposed. Often, titanium dioxide along with low levels of antioxidants and possibly optical brighteners are present in plastics. The titanium dioxide is used to make the plastic white, optical brighteners may be used to hide any yellowing, and antioxidants are used to prevent degradation during processing and over the life of the part. Mixtures of recycled plastics tend to have white plastics containing titanium dioxide pigments and black plastics containing carbon black. In addition to white and black materials, waste plastic streams can include materials in a variety of other colors, such as blue, green, brown, orange, yellow and red, which contain a variety of pigments and dyes that give them their color.

Some additives found in recycled plastics mixtures are chemical compounds of heavy metals such as cadmium (Cd), lead (Pb), mercury (Hg) or chromium (Cr). Many of these heavy metal-containing additives are no longer added to virgin plastics due to health concerns and regulations restricting their use, but they can be present at significant levels in recycled plastics mixtures.

Regulatory limits exist for the concentrations of these elements applications including electronics, packaging and toys. The RoHS directive (2002/95/EC), for example, limits the concentration of Cd to 100 ppm and the individual concentrations of Pb, Hg and Cr (VI) to 1000 ppm in electronics sold in Europe. The European Union Directive 94/62/EC on Packaging and Packaging Waste limits the sum of the concentrations of Cd, Pb, Hg and Cr (VI) to 100 ppm.

At the same time that these strict limits on the content of heavy metals are coming into effect, market and legislative forces are encouraging manufacturers to incorporate post-consumer plastics into their products.

In order to satisfy these requirements, it is important to identify and implement appropriate methods to reduce the content of heavy metals in plastics recovered from mixtures of post-consumer durable goods.

In the following, methods are described for the selective reduction of the content of Cd and other heavy metals in mixtures of plastic flakes.

SUMMARY

Methods are described for reducing the content of Cd and other heavy metals in mixtures of plastics from durable goods.

In some aspects, a method for reducing the content of a heavy metal in a mixture of solid plastic materials, wherein the mixture includes plastic flakes and there are at least two different colors of plastic flakes in the mixture includes the following steps. A percentage of each of two or more colors of flakes in the mixture is determined. A heavy metal content in the mixture based on the determined percentages is predicted. Whether the predicted content of the heavy metal in the mixture exceeds a pre-determined threshold is determined. If the predicted content exceeds the pre-determined threshold, a color sorting step is performed to obtain a subset of the mixture of plastic flakes, wherein the subset of the mixture of plastic flakes has a lower heavy metal content than the mixture prior to the color sorting step.

One or more implementations of the methods described herein may be used. The heavy metal can be cadmium. The subset can includes a lower percentage of one or more types of colored flakes than the mixture, such as red, orange, yellow, green or brown flakes. The heavy metal can be lead. Reducing lead can include obtaining a subset that includes a lower percentage of yellow flakes than the mixture. The heavy metal can be chromium. Reducing chromium can include obtaining a subset that includes a lower percentage of yellow flakes than the mixture. The color sorting step can be a first color sorting step which removes more than 50% of a first color from the mixture of plastic flakes and the method can further comprise a second color sorting step, the second color sorting step can be performed on the subset from the first color sorter step, the second color sorting step results in a batch of reject flakes and a batch of product flakes, the batch of reject flakes having at least 50% of a second color of flakes from the subset of the mixture of flakes. Color sorting can include rejecting only flakes that have a first side and a second side that are yellow in color. The method can include extruding or blending the subset of flakes to form a homogenous plastic product with a heavy metal content below the pre-determined threshold. The color sorting can include a sorting of grayscale colors and the subset can contain dark gray and black flakes in higher concentrations than the mixture. The color sorting can remove red, orange and yellow flakes from the mixture to obtain a subset that contains red, orange and yellow flakes in a lower concentration than the mixture. The method can include adding carbon black to the subset of the mixture and after adding the carbon black, extruding the subset of the mixture. The color sorting can include a sorting of grayscale colors and the subset contains white and light gray flakes in higher concentrations than the mixture. The predetermined threshold can be less than 100 ppm. The color sorting can include allowing each flake of the mixture to fall from a first location, shining one or more colored lights on each flake of the mixture as the flake is falling, detecting a color of light reflected from the flake as the flake is falling, if the reflected color of light is within a specified color region, causing the flake to fall into a second location and if the reflected color of light is not within the specified color region, causing the flake to fall into a third location. Causing the flake to fall into either the second location or the third location can include blowing air against the flake to change a trajectory of the flake as the flake falls. The color sorting can include transporting each flake along a trajectory, shining one or more colored lights on each flake of the mixture as the flake is being transported along the trajectory, detecting a color of light reflected from the flake as the flake is being transported along the trajectory, if the reflected color of light is within a specified color region, causing the flake to deviate from the trajectory and be directed to a first location and if the reflected color of light is not within the specified color region, causing the flake to be directed to a second location different from the first location. Color sorting can include transporting each flake on a moving belt, shining one or more colored lights on each flake of the mixture as the flake is being transported on the moving belt, detecting a color of light reflected from the flake as the flake is being transported on the moving belt, if the reflected color of light is within a specified color region, causing the flake to deviate from a trajectory and be directed to a first location after falling off the end of the belt and if the reflected color of light is not within the specified color region, causing the flake to be directed to a second location different from the first location after falling off the end of the belt. The specified color region can include two or more distinct colors.

Advantages of the methods described herein is that recycled plastic products can be obtained that are lower in heavy metals than the waste feed plastic flakes prior to sorting. Plastic products with lower quantities of heavy metals can be used to create new products where regulations prevent new products from having a heavy metal content above a particular threshold. Thus, a greater percentage of recycled plastics can be reused. This allows for a lower demand for virgin plastics, which in turn requires less demand on the environment for natural resources and less need for waste storage of waste plastic materials.

DESCRIPTION OF DRAWINGS

Like reference symbols in the various drawings indicate like elements.

DETAILED DESCRIPTION

This application describes methods for reducing the content of heavy metals in recycled plastics based on differences in the color of plastics containing heavy metal-based pigments. In some embodiments, the differences in color can be exploited in a single step using a single system or device. In some embodiments, these methods, systems, and devices can be used in multiple locations in the process.

In the past, pigments based on compounds of heavy metals such as Cd, Pb and Cr were frequently used in plastics. These pigments tended to be red, orange or yellow in color, so red, orange and yellow plastics found in recycled plastics mixtures may in some cases contain high levels of these heavy metals. The same pigments were also used in combination with other pigments to make plastics green or brown, so green and brown plastics in recycled plastics mixtures may also contain high levels of these heavy metals. Example 1 gives the Cd and Pb contents of flakes of various colors.

Figure 1:
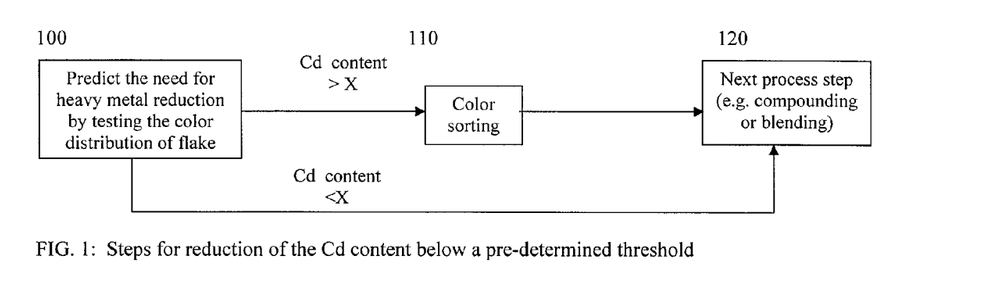
FIG. 1 shows steps for reduction of the Cd content below a pre-determined threshold.

Cadmium is one of the heavy metals most frequently found in plastics. FIG. 1 shows a process to ensure that mixtures of plastics have a level of Cd below a pre-determined threshold of X ppm. The value of X can be 100 when compliance with the RoHS directive is required, for example. Alternatively, the pre-determined threshold X can be set below 100 if needed to meet some other customer requirement. Other heavy metals such as Pb and Cr could be selected for reduction in a plastic mixture using the same principle.

The first step in the process of FIG. 1 is to predict whether the Cd content is below a pre-determined threshold of X ppm. Based on the color distribution of flakes in the mixture and the information from Example 1, we can estimate or predict the Cd concentration in the mixture (step 100). The color distribution can be measured by hand sorting a representative sample of the mixture of flakes by color, weighing the amounts of the various colors, and calculating the weight fractions of each color in the sample. The colors can be sorted into general color categories, such as red, orange, yellow, green, blue, purple, brown, grey, white and black. The fraction of each color in the mixture is multiplied by the average Cd concentration for the color to estimate the contribution of that color to the overall Cd content of the sample. The contributions of each color are then added together to estimate the overall Cd content. Example 4 shows how this simple test can help predict the content of Cd.

If the color distribution predicts that the Cd level is below a pre-determined threshold of X ppm, then the flake mixture does not need color sorting and can go to the next process step (step 120). This next process step can include additional separation steps, blending or compounding.

If, on the other hand, the color distribution predicts that the Cd level exceeds a pre-determined threshold of X ppm, we can perform a color sorting step to reduce the content of some of the colors that cause the Cd level to exceed the limit (step 110). The color sorter for this step must be capable of distinguishing the undesirable colors from the colors of the majority of the flakes in the mixture. The suitability is based on the lighting in the system, filters and backgrounds in the system and the type of camera (grayscale, full color or bichromatic).

The process of FIG. 1 can be generalized to include other individual heavy metals or the sum of heavy metals in the flake mixture. Such an approach may be necessary, for example, if meeting the Packaging Directive (94/62/EC) were required. In such a case, the logic of FIG. 1 becomes whether the total concentration of Cd, Pb, Hg and Cr (VI) is less than 100 ppm.

The color sorter used to sort the mixture should be suitable for sorting the size of flakes in the mixture. Belt sorters are particularly suitable for larger flakes up to about 50 mm, for example, whereas chute-style color sorters are more appropriate for flakes in the 4-10 mm size range.

Commercially available equipment can sort bulk materials such as plastic flakes based on the color of the flakes. Sortex (London, Great Britain) is one example of a company manufacturing color sorters.

Figure 2:
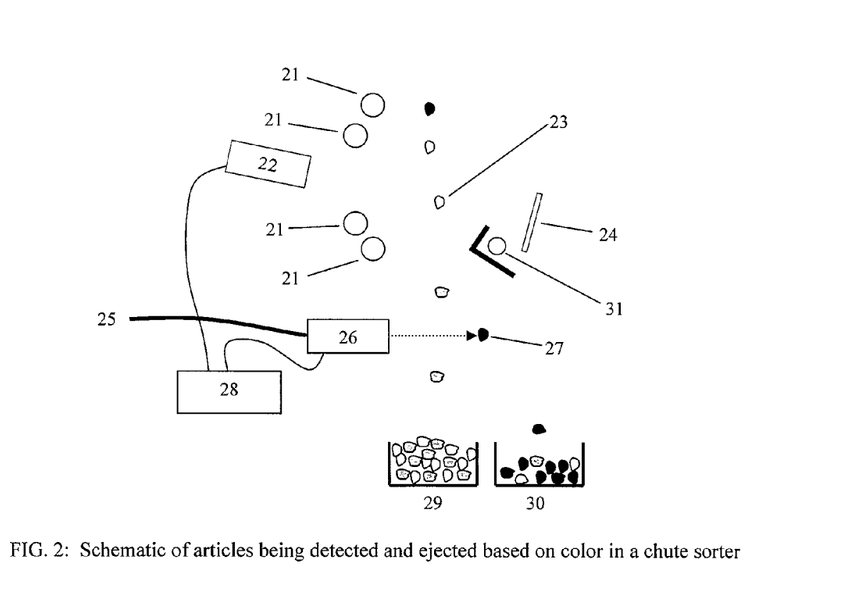
FIG. 2 shows a schematic of plastic flakes being detected and ejected based on color in a chute sorter.

Sortex Z+ optical sorters are chute-type sorters. Mixtures of flakes are fed by a vibratory feeder onto a smooth sloped chute. After the flakes slide completely down the chute, they fall clear of the chute and into a viewing area, as shown in FIG. 2. Flakes 23 in the viewing area are illuminated by visible light from lamps 21. A particularly useful configuration of the Sortex Z+ optical sorter includes a bichromatic camera 22 that detects the presence of particles 23 as they pass in front of a background 24. The background 24 is illuminated by a lamp 31 that imparts a color to the background 24. A second set of lights, cameras and background is present on the opposite side of the falling flakes to enable two sided viewing of the flakes.

The visible light illuminating the falling flakes in the Sortex Z+ optical sorter consists primarily of light surrounding two wavelengths in the visible spectrum. The bichromatic camera 22 detects intensities of the same two wavelengths. The background 24 is typically illuminated with one of the two colors. In some embodiments, the wavelengths correspond to red and blue light and the background is a white plate illuminated by blue light.

Although a chute sorter is described, the general concept of moving flakes along a trajectory and deviating the flakes to other trajectories, such as from a first trajectory to one of a second and third trajectory or even to additional trajectories, e.g., fourth, fifth, sixth or seventh trajectories, can be applied to other flake moving devices, such as moving belts, as described further below.

Figure 3:
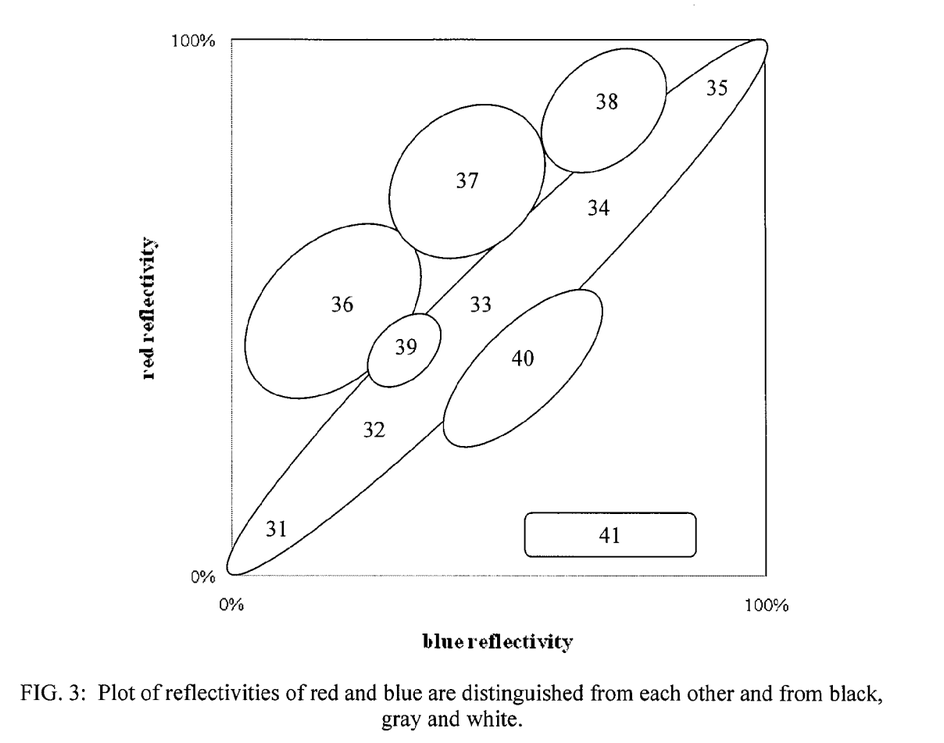
FIG. 3 shows a plot of reflectivities of red and blue as distinguished from each other and from black, gray and white.

Each pixel viewed by the cameras in the Sortex Z+ optical sorter is assigned reflectivities for both colors of light based on the reflected intensities of the colors. FIG. 3 shows where pixels of given reflectivities of the two colors of light may be plotted by a computer. Blue and red reflectivities are plotted in this example. If other reflectivities where plotted, the colors would should up in different areas on the graph.

Pixels that are black are in the lower left corner, having very little reflectivity of either color. Pixels with large values of both reflectivities are brighter colors (approaching white). The background is adjusted (by physical tilting of the white plate illuminated by a blue light in this example) such that the reflectivity coordinates of the background 41 lie far from the pixels of the vast majority of the detected particles.

As shown in FIG. 3, pixels along the axis with equal reflectivities of red and blue include the various grayscale colors including black 31, dark gray 32, medium gray 33, light gray 34 and white 35. The colors can be defined according to a color scale, such as the RAL standard or to the Tiffen Q13 (Kodak) Gray Scale. In some implementations, "black" is any shade at 16 or darker on the Tiffen Q13 Gray Scale. "Dark gray" is any shade between 10 and 16 on the Tiffen Q13 Gray Scale. "Medium gray" is any shade between 5 and 10 on the Tiffen Q13 Gray Scale. "Light gray" is any shade between 1 and 5 on the Tiffen Q13 Gray Scale. "White" is any shade lighter than 1 on the Tiffen Q13 Gray Scale. If the RAL standard is used, "black" includes grayscale colors darker than RAL 7024, including colors such as RAL 9004 and RAL 9005. "Dark gray" includes grayscale colors darker than RAL 7036 but lighter than RAL 7024. "Medium gray" includes grayscale colors darker than RAL 7047 but lighter than RAL 7036. "Light gray" includes grayscale colors darker than RAL 9002 but lighter than RAL 7047. "White" includes grayscale colors lighter than RAL 9002. Colors such as red 36, orange 37, and yellow 38 have red reflectivities exceeding the blue reflectivities. Colors such as brown 39 and green 40 are closer to the main axis, so many green and brown flakes are not distinguishable from some of the grayscale colors. Grayscale color sorting can remove darker colored flakes, such as black and dark gray to obtain a product with light flakes. Grayscale color sorting can alternatively remove light colored flakes, such as white and light gray to obtain a dark mixture. Either grayscale color sorting can also remove particularly colored flakes, such as red, orange and yellow flakes from a mixture.

In order to successfully eject a defect particle without ejecting desirable particles, the intensity coordinates of pixels in the defect particle are ideally located outside of the main portion where pixels in the accept particles are located. As shown in FIG. 3, orange 37, red 36 and yellow 38 particles are distinct from the black 31, gray 32-34 and white 35 flakes that often make up the majority of flake mixtures recovered from mixtures of durable goods plastics. Brown 39 and green 40 flakes, on the other hand, are not easily distinguished from gray flakes when the illumination consists of red and blue light.

The user tuning the sorter selects ranges of reflectivities of the two colors for particles that are accepted and for particles that are rejected. The user adjusts these ranges based on the reflectivity coordinates of pixels in images captured from various good and defect particles. The user also selects the number of defective pixels that must be located on a particle for it to be rejected. The number of defective pixels is a tuning parameter that may be used, for example, to only eject particles larger than a certain size in order to reduce losses to the reject stream 30.

Particles with colors falling within the ranges selected for ejection by the computer 28 are separated from the product stream using a short blast of compressed air 25 through an ejector 26, as shown in FIG. 2. Ejected particles 27 fall into the reject stream 30, while particles not ejected end up in the product stream 29. Additional particles with colors not within the reject cluster may also be ejected if the blast of air is sufficiently wide or long that it hits additional particles, so the reject stream 30 contains a mixture of good and reject colors.

Color sorters may be tuned to eject red, orange, yellow, green and brown flakes in order to reduce the content of Cd, Pb and Cr in the flake mixture. The resulting product streams include a stream with lesser amounts of heavy metals and a stream with greater amounts of heavy metals. Example 2 describes the results when such sorting takes place.

Because brown and green are not always distinguishable from grayscale colors when measuring the red and blue reflectivities, attempting to remove a large portion of green or brown can result in large losses of gray flakes which we would normally not want to eject.

To more efficiently eject green and brown, the Sortex Z+ optical sorter may be configured with background colors other than blue and with illumination and bichromatic camera color combinations other than blue and red. Colored light other than blue and red light may be more useful for successful detection of blue and red plastic flakes.

Other models of color sorters may examine the entire color spectrum and determine to eject particles based on the entire measured color spectrum. Such a full spectrum sort would allow distinguishing brown and green colors that are difficult to distinguish using the bichromatic cameras described above.

Color sorters using black and white cameras may also be able to distinguish and eject certain colors by appropriate selection and use of lamps, backgrounds and filters.

Color sorting may also be accomplished manually by workers trained to remove plastic pieces of certain colors. This method of color sorting is most practical for flakes larger than about 25 mm.

It is also possible to reduce the amount of heavy metal-rich colors in mixtures by isolating parts containing red, orange, yellow, green or brown plastics prior to shredding. These colored parts can be shredded separately for metal recovery, and the plastics can be kept separate from other plastics that do not tend to have high levels of heavy metals.

With chute type sorters, it is possible to eject when defect colors are seen on one side of a flake or on both sides of a flake. Some types of plastic turn yellow after exposure to light over the course of their lifetime, and ejecting flakes that have such a yellow tinge is not always desirable and is not helpful for reducing the level of heavy metals in the product. The sort logic can therefore be adjusted such that both sides must be yellow, ensuring that only particles that are indeed pigmented yellow are ejected.

Color sorting equipment also includes belt style color sorters. In such systems, cameras view flakes as they pass underneath color cameras while riding on a belt. Belt color sorters are capable of working with either large or small flakes.

Color sorting to reduce the content of Cd, Pb and Cr in flake mixtures can be accomplished in one or more stages. Example 3 describes the results for a two stage process in which red, orange and yellow are removed in a first stage and green and brown are removed in a second stage.

One can also perform additional color sorting stages to improve the yield of good product. Each ejection can eject some good particles along with the true defect particles. In addition, aggressive color sorting to remove the vast majority of certain colors can result in the ejection of flakes that may be on the border of good and defect particles in the graph of reflectivities shown in FIG. 2. The reject stream may therefore contain a considerable amount of particles that would preferably remain in the product stream. In order to recover these good particles, one can do an inverse sort to eject these good particles for recirculation into the main product stream (either before or after the initial sort). If the amount of true defect particles in the stream is about fifty percent or less, one could perform a sort similar to the first pass but with slightly relaxed ejection criteria that would allow the border flakes to remain in the product. Alternatively, the reject from the initial sort could be sorted using different illumination or detection that could better distinguish flakes with colors that might have appeared identical using the illumination and detection of the initial sort.

Color sorting to reduce the content of heavy metals may also be used in combination with color sorting used to control the color of the product. Such color control may take the form of separating light colored flakes from dark colored flakes to create streams that are lighter in color and darker in color than the original feed mixture. During this light/dark sort, the operator may choose to include heavy metal-rich colors in one of the streams. The stream that is now enriched in heavy metals may then be further sorted to reduce the level of heavy metals in that stream. Example 6 describes such a sorting strategy.

Color sorting to reduce the content of heavy metals may also be used in combination with other sorting methods capable of distinguishing materials containing high levels of heavy metals. Sorting based on X-ray fluorescence spectroscopy, for example, can be performed on the reject stream of a color sorting step to separate colored flakes containing detectable levels of heavy metals from colored flakes note containing detectable levels of heavy metals.

As described in the following examples illustrate how such color sorting can be used to create products with reduced levels of heavy metals.

EXAMPLES

The following examples demonstrate the effectiveness of reducing the Cd content of plastic-rich mixtures derived from durable goods.

Example 1

Heavy Metal Content of Flakes of Various Colors in Mixtures of ABS and HIPS Flakes Plastics from waste electronics and electronic equipment (WEEE) were separated by plastic type. One product stream contained essentially all ABS flakes and another product stream contained essentially all HIPS flakes. The flakes ranged in size from about 2 to about 8 mm.

The flakes of the ABS and HIPS products were sorted by hand into various color categories including white, yellow, orange, red, green, blue, brown, gray and black. The flakes of each color type were milled into a powder. The powder was digested and the total Cd and Pb contents were measured using Inductively Coupled Plasma Atomic Emission Spectroscopy (ICP/AES) according to EN ISO 11885. Table 1.1 shows the average Cd and Pb contents (in parts per million) of each color category for each plastic type.

TABLE 1.1

Cadmium and lead content (ppm) for ABS and HIPS flakes by color

| | ABS | | HIPS | |
|---|---|---|---|---|
| color | Cd (ppm) | Pb (ppm) | Cd (ppm) | Pb (ppm) |
| white | 12.3 | 19.7 | <0.1 | <0.1 |
| yellow | 1070 | 114 | 297 | 184 |
| orange | 3950 | 378 | 1140 | 179 |
| red | 1420 | 228 | 548 | 95.4 |
| green | 916 | 46 | 429 | 25.2 |
| blue | 1.04 | 9.42 | 4.53 | 20.2 |
| brown | 1260 | 124 | 263 | 111 |
| gray | 20.9 | 24.2 | 7.77 | 17.5 |
| black | 32.5 | 23.7 | 15.6 | 27.7 |

We note in Table 1.1 that, for both ABS and HIPS, the Cd contents were highest for orange, red, green, brown and yellow. The average Cd contents for these colors all greatly exceeded the RoHS limit of 100 ppm.

The lowest Cd contents were found in the white, blue, gray and black flakes for both ABS and HIPS. The average levels found in these colors were all well below the RoHS limit of 100 ppm.

The Pb contents are below the RoHS limit of 1000 ppm for all colors, although they were highest for red, orange, yellow and brown flakes. In applications where levels of Pb well below 1000 ppm are required, such as in packaging, the removal of yellow, orange, red and brown should reduce the Pb content in the product.

Example 2

Color Distributions of ABS Flake Mixtures Before and after Color Sorting

A mixture of ABS flakes recovered from waste electronics and electronic equipment (WEEE) was processed using a Sortex Z+ 1 color sorter. The flakes were about 2 mm to about 8 mm in size. The color sorter was tuned to eject flakes that were red, orange or yellow in color.

Table 2.1 shows the color compositions, yields and Cd and Pb contents of the feed, product and reject streams. The contents of Cd and Pb were determined using ICP/AES according to IEC 62321.

We note that essentially all of the red, orange and yellow flakes are ejected and that the total Cd content decreased from 175 ppm to 84 ppm. The Pb content also decreased from 63 ppm to 33 ppm.

TABLE 2.1

Color composition of ABS flakes (wt %) and total Cd and Pb contents (ppm)

|  | feed | product | reject |
|---|---|---|---|
| white | 34.9% | 32.9% | 40.0% |
| gray | 13.0% | 12.2% | 7.5% |
| black | 33.0% | 40.6% | 23.8% |
| yellow | 3.1% | 0.0% | 4.5% |
| orange | 0.9% | 0.0% | 5.1% |
| red | 1.9% | 0.0% | 9.7% |
| green | 4.0% | 5.2% | 3.8% |
| blue | 4.6% | 5.4% | 3.3% |
| brown | 2.0% | 1.9% | 1.0% |
| other | 2.7% | 1.7% | 1.4% |
| Total Cd content measured using IEC 62321 (ppm) | 175 | 84 | 334 |
| Total Pb content measured using IEC 62321 (ppm) | 63 | 33 | 110 |
| Overall yield | 100% | 68% | 32% |

Example 3

Reduction of Cd Content Using a Color Sorter to Remove Red, Orange and Yellow Flakes Followed by the Removal of Green and Brown Flakes A mixture of ABS flakes recovered from waste electronics and electronic equipment (WEEE) was processed using a Sortex Z+ color sorter. The flakes were about 2 mm to about 8 mm in size.

In a first pass, the color sorter was tuned to eject flakes that were red, orange or yellow in color. This sort was accomplished with red and blue illumination and detection. The sorter was then tuned by selecting the ovals 36, 37 and 38 of FIG. 3 for ejection and allowing all other colors to be accepted.

In a second pass, the color sorter was tuned to eject some portion of the green and brown flakes. This sort was accomplished with red and blue illumination and detection. The sorter was then tuned by selecting portions of the ovals 39 and 40 of FIG. 3 for ejection and allowing all other colors to be accepted.

Table 3.1 shows the Cd and Pb contents of the feed and the products after the first and second sorting steps. The contents of Cd and Pb were determined using ICP/AES according to IEC 62321.

We note that the total Cd content decreases from 175 ppm to 84 ppm to 54 ppm in the two sorting stages. The Pb content decreases from 63 ppm to 33 ppm in the first step, but seems to increase slightly in the second step.

TABLE 3.1

Cd and Pb content of ABS flake mixtures from WEEE before and after color sorting

|  | Cd content (ppm) | Pb content (ppm) |
|---|---|---|
| Without color sorting | 175 | 63 |
| After sorting to remove red, orange and yellow | 84 | 33 |
| After additional sorting to remove brown and green | 54 | 40 |

Example 4

Color Analysis of ABS Mixtures from WEEE and Comparison to Actual Cd Content

We analyzed the color distributions of two samples of ABS flakes recovered from waste electronics and electronic equipment (WEEE).

Table 4.1 shows the color compositions, the Cd contributions from each color, the total estimated Cd content, and the total Cd content measured using ICP/AES according to IEC 62321. The color contributions are calculated using values from Table 1.1 and assuming that the "other" color has an average Cd content of 22 ppm, which is the average of white, gray and black.

Table 4.1 demonstrates that measuring the color distribution is useful for predicting the Cd content. It also shows which colors contribute most to the Cd content and therefore what sorting is likely necessary to reduce the Cd content below a particular level.

TABLE 4.1

Cd contributions from colors in ABS flake mixtures from WEEE

|  | ABS sample 1 | | ABS sample 2 | |
|---|---|---|---|---|
|  | Color composition | Cd contribution (ppm) | Color composition | Cd contribution (ppm) |
| white | 44.4% | 5.3 | 34.9% | 4.3 |
| gray | 12.8% | 2.6 | 13.0% | 2.7 |
| black | 32.3% | 10.2 | 33.0% | 10.7 |
| yellow | 0.6% | 6.4 | 3.1% | 32.7 |
| orange | 0.3% | 11.9 | 0.9% | 35.5 |
| red | 2.7% | 37.8 | 1.9% | 26.9 |
| green | 2.5% | 22.6 | 4.0% | 36.7 |
| blue | 1.8% | 0.0 | 4.6% | 0.0 |
| brown | 1.7% | 20.9 | 2.0% | 24.9 |
| other | 0.9% | 0.2 | 2.7% | 0.6 |
| Total estimated Cd Content (ppm) |  | 121 |  | 175 |
| Total Cd content measured using IEC 62321 (ppm) |  | 111 |  | 175 |

Example 5

Color Analysis of ABS Mixtures from Shredded End of Life Vehicles (ELV) and Comparison to Actual Cd Content We analyzed the color distributions of a sample of ABS flakes recovered from shredded End of Life Vehicles (ELV).

Table 5.1 shows the color composition, the Cd contributions from each color, the total estimated Cd content, and the total Cd content measured using ICP/AES according to IEC 62321. The color contributions are calculated using values from Table 1.1 and assuming that the "other" color has an average Cd content of 22 ppm, which is the average of white, gray and black.

Table 5.1 demonstrates that measuring the color distribution is useful for predicting the Cd content. It also shows which colors contribute most to the Cd content and therefore what sorting is likely necessary to reduce the Cd content below a particular level.

TABLE 5.1

Cd contributions from colors in ABS flake mixtures from WEEE

| | ELV ABS sample | |
|---|---|---|
| | Color composition | Cd contribution (ppm) |
| white | 12.2% | 1.5 |
| gray | 17.3% | 3.6 |
| black | 68.5% | 22.3 |
| yellow | 0.0% | 0.0 |
| orange | 0.1% | 2.1 |
| red | 0.1% | 1.1 |
| green | 0.2% | 1.5 |
| blue | 1.0% | 0.0 |
| brown | 0.6% | 7.7 |
| other | 0.0% | 0.0 |
| Total estimated Cd Content | | 40 |
| Total Cd content measured using IEC 62321 (ppm) | | 34 |

Example 6

Color Sorting to Control Color and Reduce Heavy Metals

Figure 4:
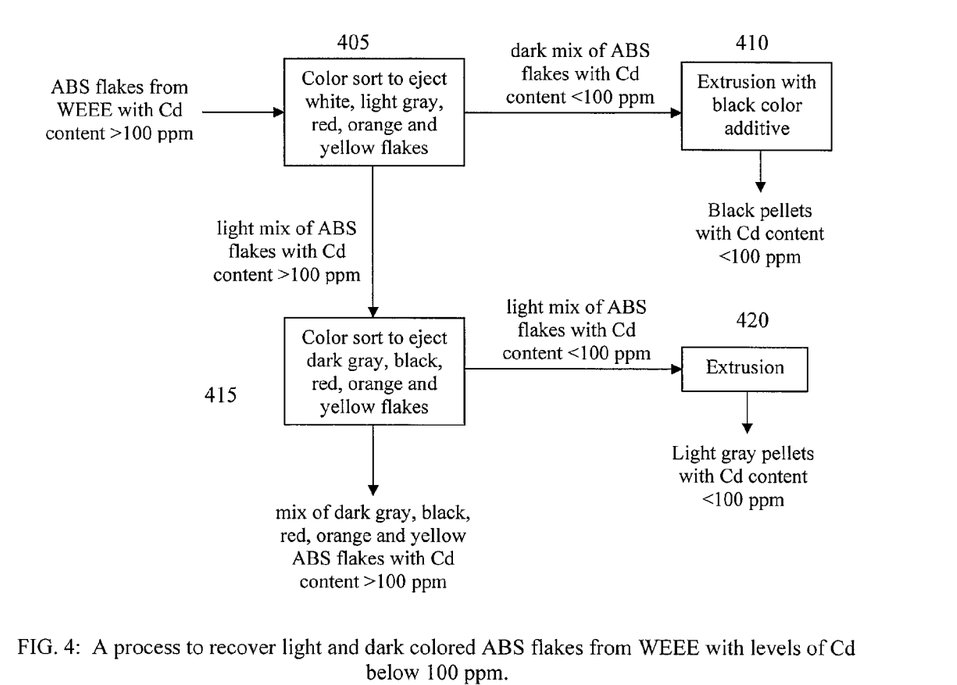
FIG. 4 shows a process to recover light and dark colored ABS flakes from WEEE with levels of Cd below 100 ppm.

A mixture of ABS flakes recovered from waste electronics and electronic equipment (WEEE) was processed using a Sortex Z+ color sorter as shown in FIG. 4. The flakes were about 2 mm to about 8 mm in size.

In a first pass, the color sorter was tuned to eject the majority of flakes that were white, light gray, red, orange or yellow in color (step 405).

The product was greatly enriched in dark flakes such that it could be easily colored black with a small amount of carbon black in a compounding or extrusion step (step 410). The Cd content of the stream was also below 100 ppm.

The reject stream from the initial sort was mostly light gray and white flakes, but also contained most of the red, orange and yellow flakes along with a few dark gray and black flakes carried into the stream when some of the reject particles were ejected.

The reject stream from the first sort was further sorted to remove darker flakes, e.g., dark gray and black, and red, orange and yellow flakes (step 415).

The product from this second sort was primarily light gray and white flakes, so extrusion of the mixture resulted in a very light gray product (step 420). The Cd content of the stream was also below 100 ppm since most of the red, orange and yellow flakes had been removed.

The reject from this second sort was a mixture of dark flakes and red, orange and yellow flakes. Additional sorting of the stream could be accomplished to recover the dark flakes, if desired.

The invention claimed is:

1. A method for reducing the content of a heavy metal in a mixture of solid plastic materials, wherein the mixture includes plastic flakes and there are at least two different colors of plastic flakes in the mixture, the method comprising:
   determining a percentage of each of two or more colors of flakes in the mixture;
   predicting a heavy metal content in the mixture by multiplying the determined percentage for each color with an estimated heavy metal concentration for that color to obtain a heavy metal contribution for each color and adding the heavy metal contributions of each color;
   determining whether the predicted content of the heavy metal in the mixture exceeds a pre-determined threshold; and
   if the predicted content exceeds the pre-determined threshold, performing a color sorting step to obtain a subset of the mixture of plastic flakes, wherein the subset of the mixture of plastic flakes has a lower heavy metal content than the mixture prior to the color sorting step.

2. The method of claim 1, wherein the heavy metal is cadmium.

3. The method of claim 2, wherein the subset includes a lower percentage of red flakes than the mixture.

4. The method of claim 2, wherein the subset includes a lower percentage of orange flakes than the mixture.

5. The method of claim 2, wherein the subset includes a lower percentage of yellow flakes than the mixture.

6. The method of claim 2, wherein the subset includes a lower percentage of green flakes than the mixture.

7. The method of claim 2, wherein the subset includes a lower percentage of brown flakes than the mixture.

8. The method of claim 1, wherein the heavy metal is lead.

9. The method of claim 8, wherein the subset includes a lower percentage of yellow flakes than the mixture.

10. The method of claim 1, wherein the heavy metal is chromium.

11. The method of claim 10, wherein and the subset includes a lower percentage of yellow flakes than the mixture.

12. The method of claim 1, wherein the color sorting step is a first color sorting step which removes more than 50% of a first color from the mixture of plastic flakes and the method further comprises a second color sorting step, the second color sorting step is performed on the subset from the first color sorter step, the second color sorting step results in a batch of reject flakes and a batch of product flakes, the batch of reject flakes having at least 50% of a second color of flakes from the subset of the mixture of flakes.

13. The method of claim 1, wherein color sorting includes rejecting only flakes that have a first side and a second side that are yellow in color.

14. The method of claim 1, further comprising extruding or blending the subset of flakes to form a homogenous plastic product with a heavy metal content below the pre-determined threshold.

15. The method of claim 1, wherein the color sorting includes a sorting of grayscale colors and the subset contains dark gray and black flakes in higher concentrations than the mixture.

16. The method of claim 15, wherein the color sorting removes red, orange and yellow flakes from the mixture to obtain a subset that contains red, orange and yellow flakes in a lower concentration than the mixture.

17. The method of claim 15, further comprising:
adding carbon black to the subset of the mixture; and
after adding the carbon black, extruding the subset of the mixture.

18. The method of claim 1, wherein the color sorting includes a sorting of grayscale colors and the subset contains white and light gray flakes in higher concentrations than the mixture.

19. The method of claim 1, wherein the predetermined threshold is less than 100 ppm.

20. The method of claim 1, wherein the color sorting includes:
allowing each flake of the mixture to fall from a first location;
shining one or more colored lights on each flake of the mixture as the flake is falling;
detecting a color of light reflected from the flake as the flake is falling;
if the reflected color of light is within a specified color region, causing the flake to fall into a second location; and
if the reflected color of light is not within the specified color region, causing the flake to fall into a third location.

21. The method of claim 20, wherein causing the flake to fall into either the second location or the third location includes blowing air against the flake to change a trajectory of the flake as the flake falls.

22. The method of claim 1, wherein the color sorting includes:
transporting each flake along a trajectory;
shining one or more colored lights on each flake of the mixture as the flake is being transported along the trajectory;
detecting a color of light reflected from the flake as the flake is being transported along the trajectory;
if the reflected color of light is within a specified color region, causing the flake to deviate from the trajectory and be directed to a first location; and
if the reflected color of light is not within the specified color region, causing the flake to be directed to a second location different from the first location.

23. The method of claim 1, wherein color sorting includes:
transporting each flake on a moving belt;
shining one or more colored lights on each flake of the mixture as the flake is being transported on the moving belt;
detecting a color of light reflected from the flake as the flake is being transported on the moving belt;
if the reflected color of light is within a specified color region, causing the flake to deviate from a trajectory and be directed to a first location after falling off the end of the belt; and
if the reflected color of light is not within the specified color region, causing the flake to be directed to a second location different from the first location after falling off the end of the belt.

24. The method of claim 20, wherein the specified color region includes two or more distinct colors.

25. The method of claim 1, wherein the estimated heavy metal concentration for each color is an average heavy metal concentration for each color from a sample mixture.

* * * * *

UNITED STATES PATENT AND TRADEMARK OFFICE
CERTIFICATE OF CORRECTION

PATENT NO. : 8,302,777 B2  
APPLICATION NO. : 12/905339  
DATED : November 6, 2012  
INVENTOR(S) : Brian L. Riise Page 1 of 1

It is certified that error appears in the above-identified patent and that said Letters Patent is hereby corrected as shown below:

Column 12, line 50 (Claim 11), after "wherein" please delete "and".

Signed and Sealed this  
Nineteenth Day of February, 2013

Teresa Stanek Rea  
*Acting Director of the United States Patent and Trademark Office*